US007822340B2

(12) United States Patent
Matityahu et al.

(10) Patent No.: US 7,822,340 B2
(45) Date of Patent: Oct. 26, 2010

(54) PHOTODIODE ASSEMBLY WITHIN A FIBER OPTIC TAP AND METHODS THEREOF

(75) Inventors: Eldad Matityahu, Palo Alto, CA (US);
Robert Shaw, Los Gatos, CA (US);
Dennis Carpio, San Jose, CA (US);
Gurveer Singh, San Bruno, CA (US);
William Nelson Bedell, Cupertino, CA (US)

(73) Assignee: NetOptics, Inc., San Jose, CA (US)

( * ) Notice: Subject to any disclaimer, the term of this patent is extended or adjusted under 35 U.S.C. 154(b) by 537 days.

(21) Appl. No.: 11/925,626

(22) Filed: Oct. 26, 2007

(65) Prior Publication Data
US 2009/0110391 A1 Apr. 30, 2009

(51) Int. Cl.
*H04B 10/08* (2006.01)
(52) U.S. Cl. ............................... 398/17; 398/20; 398/9; 398/33
(58) Field of Classification Search ............... 398/9, 398/17, 20, 33, 82, 91, 135, 136
See application file for complete search history.

(56) References Cited

U.S. PATENT DOCUMENTS

| | | | |
|---|---|---|---|
| 5,696,859 A * | 12/1997 | Onaka et al. ............... 385/24 |
| 5,710,846 A | 1/1998 | Wayman et al. | |
| 5,781,318 A | 7/1998 | Tremblay | |
| 6,041,037 A | 3/2000 | Nishio et al. | |
| 6,041,307 A | 3/2000 | Ahuja et al. | |
| 6,167,025 A | 12/2000 | Hsing et al. | |
| 6,424,627 B1 | 7/2002 | Sorhaug et al. | |
| 6,449,247 B1 | 9/2002 | Manzardo et al. | |
| 6,650,803 B1 | 11/2003 | Ramaswami et al. | |
| 6,687,009 B2 | 2/2004 | Hui et al. | |
| 6,850,706 B2 * | 2/2005 | Jager et al. ............... 398/31 |
| 6,882,654 B1 | 4/2005 | Nelson | |
| 6,898,630 B2 | 5/2005 | Ueno et al. | |
| 7,277,957 B2 | 10/2007 | Rowley et al. | |
| 7,430,354 B2 * | 9/2008 | Williams ............... 385/128 |
| 7,486,625 B2 | 2/2009 | Matityahu et al. | |
| 2001/0040870 A1 | 11/2001 | Ohmori et al. | |

(Continued)

OTHER PUBLICATIONS

"Fast Ethernet Fiber-to-Fiber Converters", Canary Communications, Inc. 7 pages total, 2004.

(Continued)

*Primary Examiner*—Dalzid Singh
(74) *Attorney, Agent, or Firm*—IP Strategy Group, P.C.

(57) ABSTRACT

An arrangement in a fiber optic network device for analyzing a set of optical signals traversing the fiber optic network device is provided. The arrangement includes a set of ports for receiving and outputting the set of optical signals. The arrangement also includes a set of photodiodes, which is configured at least for receiving and forwarding the set of optical signals. The arrangement further includes a splitter, which is configured at least for receiving the set of optical signals from a first photodiode, splitting the set of optical signals into at least a first part and a second part, and forwarding the first part to a second photodiode and the second part to a third photodiode. The set of optical signals is configured to traverse the fiber optic network device irrespective whether power is provided to circuitry of the fiber optic network device.

20 Claims, 7 Drawing Sheets

U.S. PATENT DOCUMENTS

| | | |
|---|---|---|
| 2002/0176355 A1 | 11/2002 | Mimms et al. |
| 2003/0112760 A1 | 6/2003 | Puppa et al. |
| 2004/0062556 A1 | 4/2004 | Kubo et al. |
| 2004/0096227 A1 | 5/2004 | Bulow |
| 2004/0120259 A1 | 6/2004 | Jones et al. |
| 2005/0129033 A1 | 6/2005 | Gordy et al. |
| 2005/0257262 A1 | 11/2005 | Matityahu et al. |
| 2006/0083511 A1 | 4/2006 | Edmunds et al. |
| 2007/0002754 A1 | 1/2007 | Matityahu et al. |

OTHER PUBLICATIONS

"Sequence reducer/Sequence Mirror Operator's Guide", Pefibit Networks, Inc. 13 pages total, 2001-2005.

"PeriScope Central Management System (CMS) 5.0 Administrator's Guide", Peribit Networks, Inc, 13 pages total. 2003-2004.

"VSS Coppertap Literature PA", VSS Monitoring Inc, 2 pages, 2003-2004.

"VSS Easy Install Guide PA", VSS Monitoring Inc, 8 pages total. 2003-2005.

"VSS Linksafe PA", VSS Monitoring Inc., 1 page. 2003-2005.

"Sequence Reducer/ Sequence Mirror Operator's Guide", Peribit Networks, Inc. 13 pages total, 2001-2005.

"VSS Coppertap Literature", VSS Monitoring Inc. 2 pages. 2003-2004.

"VSS Easy Install Guide", VSS Monitoring Inc. 8 pages total. 2003-2005.

"VSS Linksafe", VSS Monitoring Inc., 1 page. 2003-2005.

"Belkin Quick Installation Guide", N1 Vision Wireless Router, Belkin International, Inc., no date, 3 pages total.

"Network Status Display", Belkin International, Inc., 2007, 1 page total.

"International Search Report", Issued in PCT Application No. PCT/US2008/080598; Mailing Date: May 26, 2009.

"Written Opinion", Issued in PCT Application No. PCT/US2008/080598; Mailing Date: May 26, 2009.

"International Preliminary Report on Patentability", Issued in PCT Application No. PCT/US2006/25436: Mailing Date: May 22, 2008.

Anonymous, "100Base-TX/100BBase-FX Media Converters E-100BTX-FX-04 User's Guide", Transitions Networks, Inc. Copyright 1998-2000, 4 pages.

"Replacement Statement and Explanantion under 37CFR 1.915 In Support of Request for Inter Partes Reexamination of U.S. Appl. No. 7,486,625", Sonnenschein Nath & Rosenthal LLP, Jan. 22, 2010, 251 pages.

"Request for Inter Partes Reexamination of U.S. Appl. No. 7,486,625", Sonnenschein Nath & Rosenthal LLP, Dec. 18, 2009, 69 pages.

Gigamon Systems LLC, "GigaVUE—Product Brief", Gigamon Systems LLC, http://web.archive.org/web/20070815021951/www.gigamon.com/pdf/GigamonSystems-OnePageProductBrief.pdf, Aug. 15, 2007, 1 page.

"Inter Partes Reexamination Office Action", U.S. Appl. No. 95/001,318, Patent in Re-examination: 7,486,625, mailing date: Apr. 23, 2010.

"Non Final Office Action", U.S. Appl. No. 11/174,032, mailing date: Apr. 23, 2008.

* cited by examiner

PHOTODIODE ASSEMBLY WITHIN A FIBER OPTIC TAP AND METHODS THEREOF

BACKGROUND OF THE INVENTION

Monitoring devices have long been employed to determine the vitality of a network. In a business environment, monitoring devices have been engaged by enterprises to ensure reliable performance, enable fault detection, and detect unauthorized activities. For monitoring devices, test access ports or taps may create a monitoring access port between two network devices, such as switches, routers, and more. Accordingly, different types of taps may be available, including but are not limited to, copper tap (10/100/1000), Fiber tap (e.g., 1 gigabyte 10 gigabyte), and port aggregator.

To facilitate discussion, FIG. 1A shows a simple block diagram of a fiber optic tap. A fiber optic tap may be employed for monitoring network traffic on a fiber optic network system. A fiber optic tap 102 may include at least two network ports, network ports 104 and 106, each of which may include an input port (a receiver (RX) port) and an output port (transceiver (TX) port). To monitor the network traffic at least a monitor port 108 may be available. In an example, network traffic flowing through the network ports is copied and routed to a monitor device via monitor port 108.

Unfortunately, a typical fiber optic tap does not have any visual indicator or control interface to check whether fiber optic tap 102 has sufficient signal strength on the network ports to ensure error free network traffic flow. Signal strength may be affected for various reasons including, but are not limited to, wrong type of cable, cable length is too long, mismatch between the transmitter laser wavelength and the fiber optic splitter in the fiber optic tap, connector defects, and the like.

Those skilled in the arts are aware that the fluidity of network traffic through a network device, such as a fiber optic tap, may be determined based on the signal strength received by the network device. In other words, if the signal strength is high at a port, the port is most likely receiving the network traffic. However, if the signal strength is low at a port, the port may be experiencing inconsistent data transfer or even data loss.

To facilitate discussion, FIG. 1B shows a flow diagram of a signal through fiber optic tap 102 with two network ports (104 and 106) and monitoring port 108. Consider the situation wherein, for example, transmitters are connected to fiber optic tap 102 via a set of fiber optic line. Each network port may be connected to a transmitter via a fiber optic line. In an example, a first fiber optic line is connected to an input port (RX) of network port 104 and a second fiber optic line is connected to an input port (RX) of network port 106. A first optical signal coming from the first fiber optic line may be received by a connector 152 at network port 104. The first optical signal mats flow along a path 154 to a splitter 156, which may be configured to split the first optical signal and forward the first optical signal along paths 158 and 160 to an output (TX) port of network port 106 via a connector 162 and an output (TX) port of monitor port 108 via a connector 164, respectively. Similarly, a second optical signal coming from the second fiber optic line may be received by connector 162 at network port 106. The second optical signal may flow along a path 166 to a splitter 168, which may be configured to split the second optical signal and forward the second signal along paths 170 and 172 to an output (TX) port of network port 104 via connector 152 and an output (TX) port of monitor port 108 via connector 164, respectively.

Without visual confirmation, the strength of the optical signals being received by each connector (e.g., connector 152, connector 162, and connector 164) is unknown. In an example, a user, such as an information technology (IT) personnel, is unable to quickly determine the status of the optical signals without logging onto the network system and bringing up the tap log, for example. More importantly, without visual confirmation, the IT personnel is unable to determine the signal strength in order to determine insertion loss, which is the difference between the signal strength being transmitted by the transmitter SFP (small form-factor pluggable) and the signal strength being received by the receiver SFP.

BRIEF SUMMARY OF THE INVENTION

The invention relates, in an embodiment, to an arrangement in a fiber optic network device for analyzing a set of optical signals traversing the fiber optic network device. The arrangement includes a set of ports, which includes at least a set of input ports for receiving the set of optical signals and a set of output ports for outputting the set of optical signals from the fiber optic network device. The arrangement also includes a set of photodiodes, which is configured at least for receiving and forwarding the set of optical signals. The arrangement further includes a splitter, which is configured at least for receiving the set of optical signals from a first photodiode of the set of photodiodes, splitting the set of optical signals into at least a first part and a second part, and forwarding the first part to a second photodiode of the set of photodiodes and the second part to a third photodiode of the set of photodiodes. The set of optical signals is configured to traverse the fiber optic network device between the set of input ports and the set of output ports irrespective whether power is provided to circuitry of the fiber optic network device.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
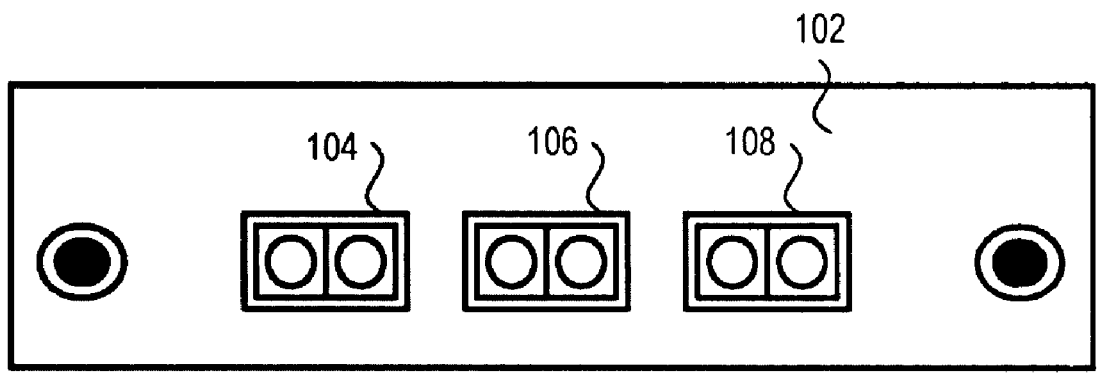
FIG. 1A shows a simple block diagram of a fiber optic tap.
Figure 1B:
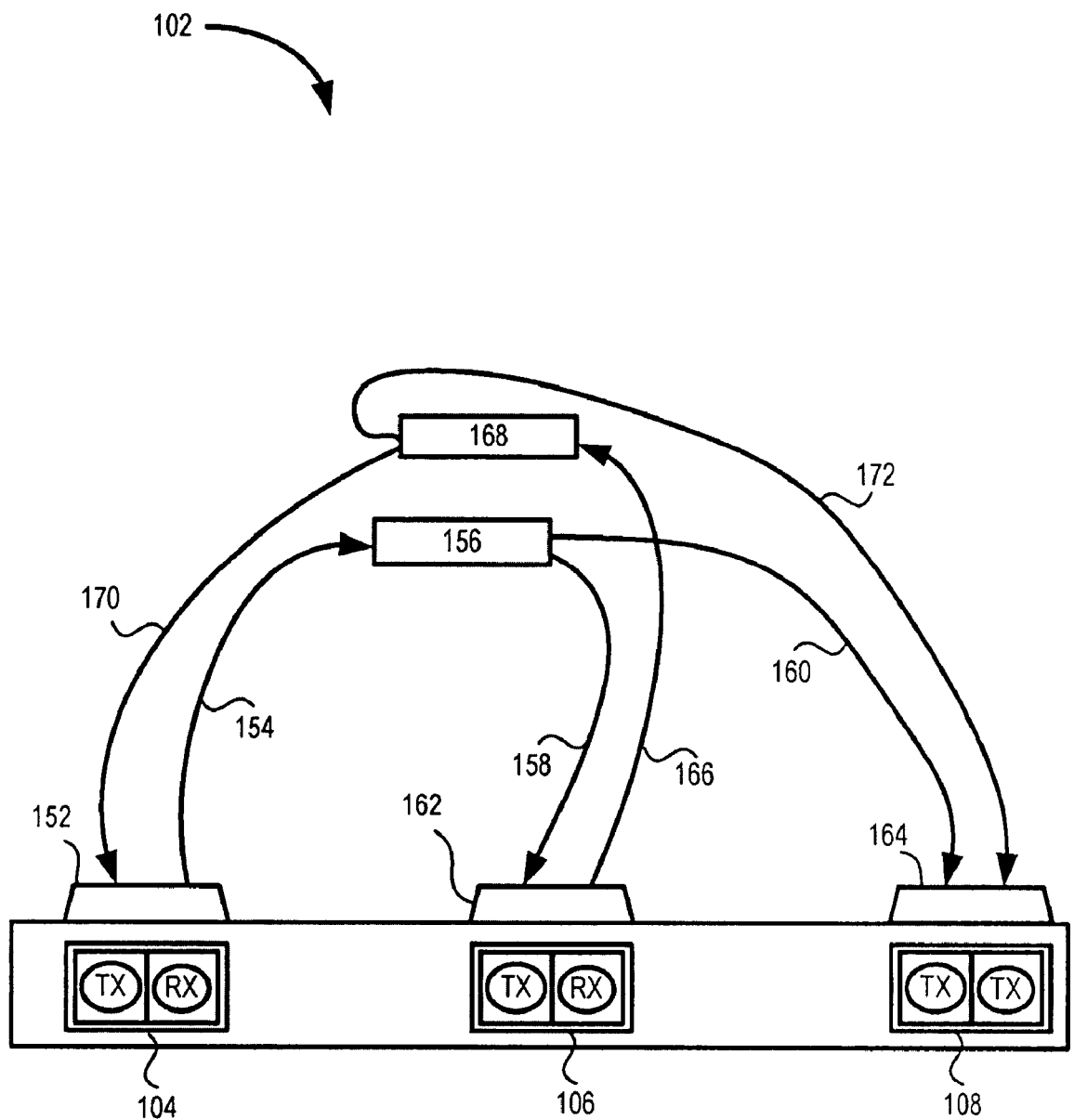
FIG. 1B shows a schematic diagram of a fiber optic tap.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As aforementioned, insertion loss may occur when the strength of the optical signal sent by a transmitter is more than the strength of the optical signal received by the receiver. With the insertion loss data, an IT personnel may be able to determine the source of the insertion loss. However, insertion loss is not a piece of data that is readily available to the IT personnel.

In one aspect of the invention, the inventors herein realize that received power level (signal strength) may be determined by measuring the amount of current generated at photodiode pins. Unfortunately, the configuration of the prior art fiber optic tap does not enable the retrieval of the desired data. The inventors herein realize that by adding photodiodes (PDs) into the configuration of a fiber optic tap, current information may be extracted without negatively impacting the normal signal flow through the fiber optic tap. In accordance with embodiments of the invention, a photodiode assembly is provided within a fiber optic tap. Embodiments of the invention include methods for converting incident light from optical signal received by a photodiode in order to determine insertion loss.

In this document, various implementations may be discussed using a single monitor port tap. This invention, however, is not limited to a single monitor port tap and may include any other tap arrangements that may accept data from fiber optic lines. Instead, the discussions are meant as examples and the invention is not limited by the examples presented.

Also, in this document, various implementations may be discussed using a microcontroller. This invention, however, is not limited to a microcontroller and may include any logic arrangement, such as a field-programmable gate array (FPGA) that may be capable of performing analysis. Instead, the discussions are meant as examples and the invention is not limited by the examples presented.

In an embodiment of the invention, a photodiode assembly may include a plurality of photodiodes. As discussed herein, a photodiode refers to a p-n junction designed to be responsive to optical input. In an example, a photodiode may respond to light by producing a measurable electronic current.

In another embodiment of the invention, a photodiode assembly may include a plurality of photodiode interface circuit (PDIC), which may include a plurality of electronic components. Each PDIC may be utilized to convert the current flowing from each photodiode into an analog voltage.

In yet another embodiment of the invention, a logic arrangement, such as a microcontroller, may be employed to convert an analog voltage into a digital value for the voltage. In an embodiment, the logic arrangement may include an alternating current (AC) to direct current (DC) converter function for converting the analog voltage into a digital value for the voltage. As can be appreciated from the foregoing, the AC/DC converter function may also be implemented as an independent component, such as an AC/DC converter integrated circuit. The logic arrangement may also include logic for determining insertion loss by applying mathematical expressions to the digital value of the voltage.

In yet another embodiment of the invention, a visual display arrangement may be employed to display the data determined by the logic arrangement. Hence, the visual display arrangement may provide a quick visual confirmation of the signal strength on each port. In addition, the visual display arrangement may be employed to provide statistical data about the data traffic flowing through the fiber optic tap.

The features and advantages of the present invention may be better understood with reference to the figures and discussions that follow.

Figure 2:
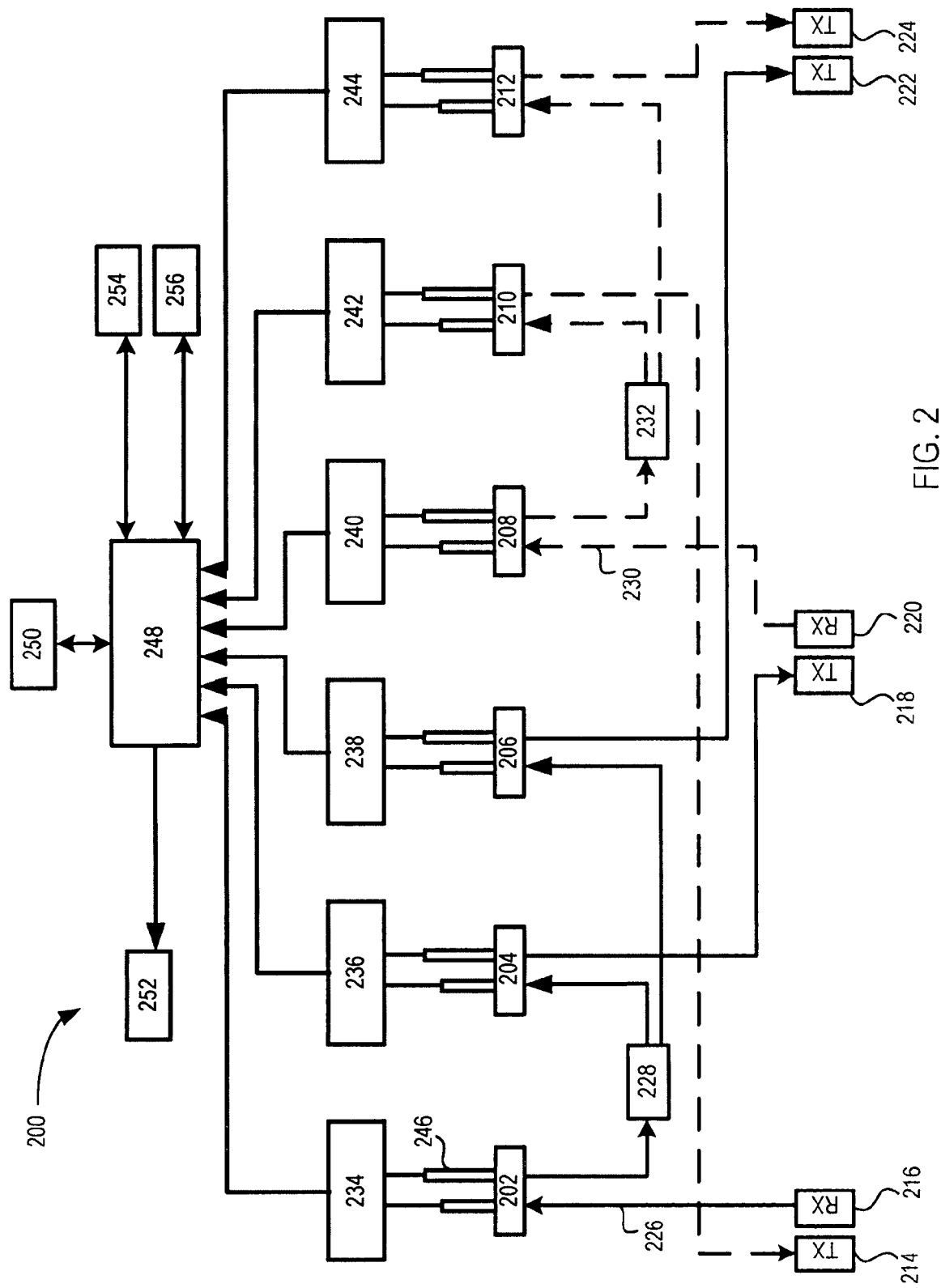
FIG. 2 shows, in an embodiment of the invention, a simple schematic of a fiber optic tap with a photodiode assembly.

FIG. 2 shows, in an embodiment of the invention, a simple block diagram of a fiber optic tap 200 with a photodiode assembly. In an embodiment of the invention, a photodiode assembly may include a plurality of photodiodes (202, 204, 206, 208, 210 and 212). Each photodiode (e.g., P/N: SSOEM0000B20058 manufactured by Lightwave2020, Milpitas, Calif.) may be capable of receiving and forwarding a signal.

Consider the situation wherein, for example, transmitters are coupled to a fiber optic tap via a set of fiber optic line. A fiber optic tap 200 may include a receiving connector 214, for receiving a first optical signal transmitted by the first transmitter. Unlike the prior art, the first optical signal is not sent immediately to a splitter. Instead, the first optical signal may travel along a fiber optic cable 226 to photodiode 202. Upon receiving the first optical signal, photodiode 202 may divert the light to a splitter 228.

Splitter 228 may receive the first optical signal and split the first optical signal and forward each part of the first optical signal to photodiodes 204 and 206. Those skilled in the art are aware that the splitter may not always evenly distribute the optical signal. Instead, the signal level that may be received by photodiodes 204 and 206 may be based on user's discretion. In an example, the user may set the split to be a 70/30 split. In other words, splitter 228 is configured to send 70 percent of the first optical signal to photodiode 204 while only sending 30 percent of the first optical signal to photodiode 206.

Once photodiodes 204 and 206 have received the designated part of the first optical signal, photodiodes 204 and 206 may forward each part of the first optical signal to an output port. In an example, photodiode 204 may forward a first part of the first optical signal to a transmit connector 218, which may be associated with a network port. Likewise, photodiode 206 may forward a second part of the first optical signal to a transmit connector 222, which may be associated with a monitor port.

Similarly, the same arrangement may be configured for receiving a second optical signal from the second transmitter. In an example, a second optical signal is received by a receiver 220. The second optical signal may be sent along a fiber optic cable 230 to photodiode 208. Upon receiving the second optical signal, photodiode 208 may divert the light to a splitter 232. Splitter 232 may receive the second optical signal and split the second optical signal and forward each part of the second optical signal to photodiodes 210 and 212. Once photodiodes 210 and 212 have received the designated part of the second optical signal, photodiodes 210 and 212 may forward each part of the second optical signal to a transmit connector 214 and a transmit connector 224, respectively.

As can be appreciated from the foregoing, the ability of the photodiodes to receive and forward an optical signal may be performed regardless of power availability. Therefore, network traffic is not negatively impacted if power is not available for a photodiode to perform its other functions. In addition, each photodiode is capable of converting the photon energy received in the optical signal into an electrical signal. However, if power is not available, the current of the electrical signal is not able to be forwarded for further analysis.

In an embodiment of the invention, the photodiode assembly may include a plurality of photodiode interface circuits (234, 236, 238, 240, 242, and 244). Each PDIC is configured to receive the current of the electrical signal flowing from a photodiode. In an example, photodiode 202 may send current of the electrical signal via a set of pins 246 to PDIC 234. In an embodiment, the set of pins 246 is a set of gold-plated pins. Gold may be employed since gold is a good conductor and may not cause a drop in current during the transmission. As can be appreciated from the foregoing, the other photodiodes (204-212) may be configured to perform a similar function.

Those skilled in the art are aware that in order to convert current of the electrical signal into a digital value of a voltage, the current must first be converted into analog voltage. Thus, upon receiving the current of the electrical signal from the photodiode each PDIC is configured to convert the current of the electrical signal into an analog voltage of the electrical signal. In an example, PDIC 234 may convert the current received from photodiode 202 into an analog voltage.

Once the current-to-analog voltage conversion has occurred, each PDIC may forward the analog voltage to a logic arrangement such as a microcontroller 248. In other words, each PDIC may individually send the analog voltage to the logic arrangement without having to wait on the other PDICs within the photodiode assembly. In an example, PDIC 234 may forward the analog voltage to microcontroller 248 once conversion has occurred even though the other PDICs (236-244) may not yet be ready to perform the same function.

In an embodiment, the logic arrangement (e.g., microcontroller 248) may include an AC/DC converter function for converting the analog voltage to a digital value for the voltage. As aforementioned, the AC/DC converter function may also be implemented as an independent component, such as an AC/DC converter integrated circuit. In addition, the logic arrangement (e.g., microcontroller 248) may also include logic for converting the digital value of the voltage into decibels, in order to determine insertion loss. In an embodiment, the logic for performing the calculations may be occasionally updated by downloading the latest version from an external source via a port 250. With the data about insertion loss, the user, such as an IT personnel, may be able to perform troubleshooting.

Once the insertion loss has been determined, the insertion loss may be displayed on a visual display arrangement 252 of fiber optic tap 200, in an embodiment. As can be appreciated from the foregoing, besides being displayed, the insertion loss may also be distributed by other methods, such as sending the statistical data as a report to a remote user or forwarding the data to an application program, via ports 254 and 256 (e.g., Ethernet port, RS232 port), for analysis. Also, since the data may be remotely accessible, monitoring may be performed offsite, enabling the IT personnel more flexibility in performing his task of keeping the network fully functional.

Figure 3A:
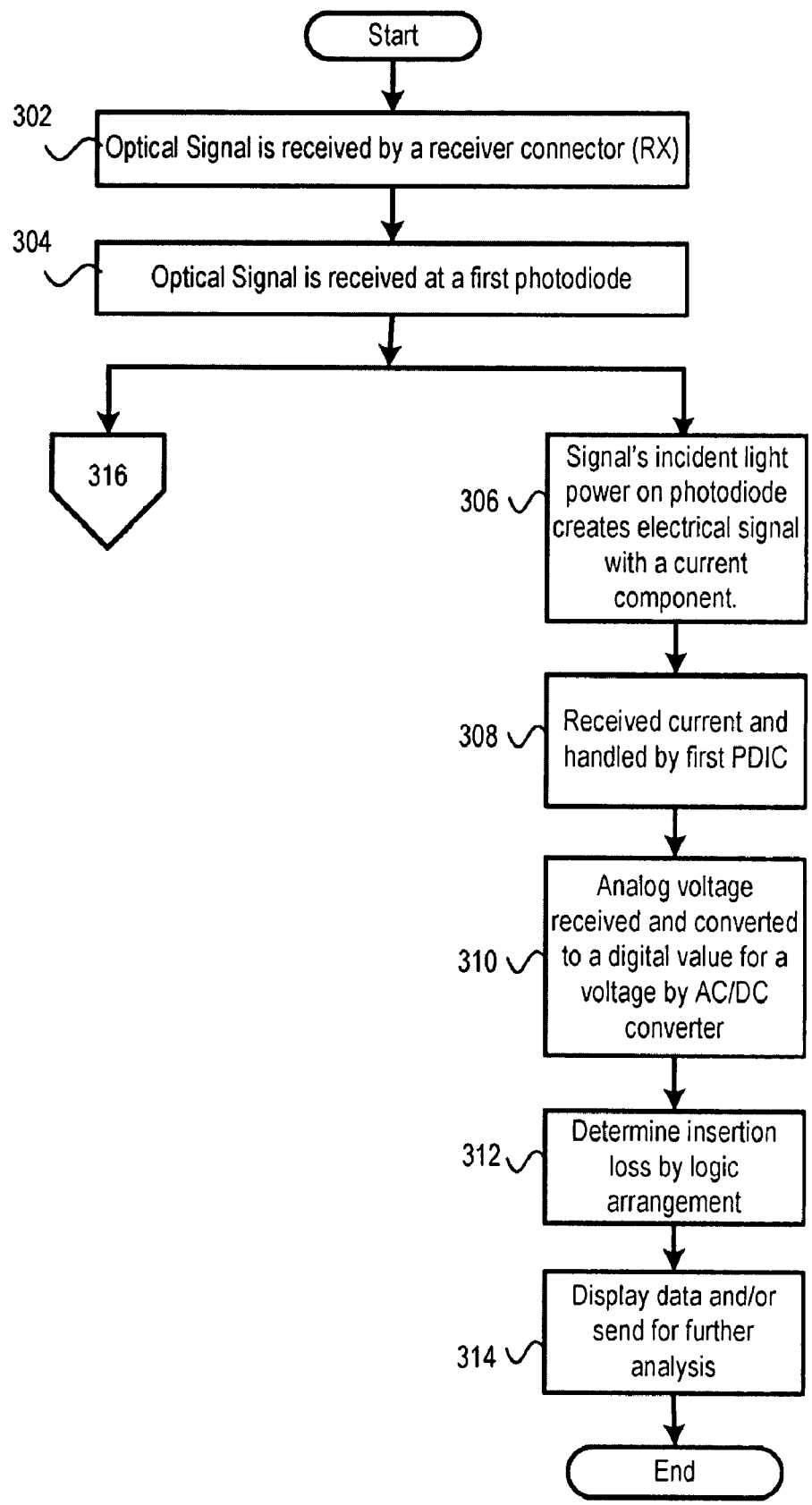
FIGS. 3A and 3B show, in an embodiment of the invention, a simple low chart illustrating the flow of an optical signal through a fiber optic tap.
Figure 3B:
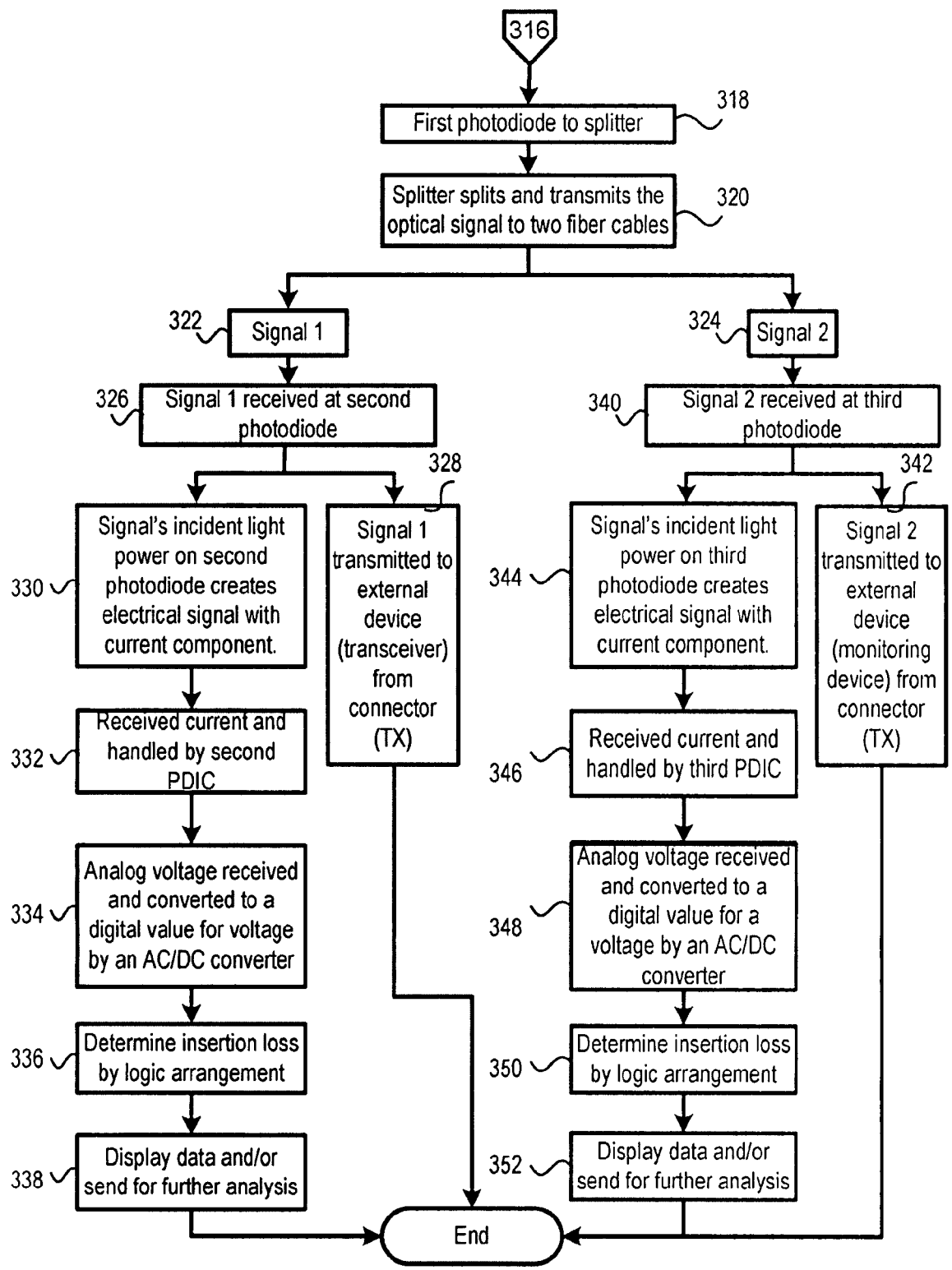

FIGS. 3A and 3B shows, in an embodiment of the invention, a simple flow chart illustrating the flow of a light signal through a fiber optic tap. FIGS. 3A and 3B will be discussed in relation to FIG. 4, which shows, in an embodiment of the invention, a flow diagram of a signal being sent by a transmitter through a fiber optic tap arrangement.

At a first step 302, a signal is received by a receiver. Consider the situation wherein, for example, a transmitter SFP 402, such as an 850 nanometer SFP model, may be coupled to a fiber optic tap arrangement 400 via a fiber optic line 404. Fiber optic line 404 may be coupled to a receiver, such as first connector 406. Accordingly, the signal being received is an optical signal, since the signal is being sent along a fiber optic line.

At a next step 304, the optical signal may be received by a first photodiode. In an example, the optical signal may travel along a fiber optic line to be received by a photodiode 408. Upon receiving the optical signal, the photodiode may be configured to perform at least two functions, as shown by steps 306 and 316. As can be appreciated from the foregoing, both functions may be performed in any order or may, be performed simultaneously.

At a next step 306, the photodiode may, convert the incident light power from the optical signal into an electrical signal with a current component. In an example, photodiode 408 may convert the photon light from the signal that is shown onto the p-n junction into current.

At a next step 308, the current may be received and processed by a PDIC. In an example, photodiode 408 may send the current of the electrical signal to a PDIC 434 via a set of gold-plated pins 410 and a connector 414. Upon receiving the current, PDIC 434 may convert the current to analog voltage.

At a next step 310, the analog voltage is received and converted to a digital value for the voltage by the AC/DC converter. In an example, PDIC 434 may send the analog voltage to an AC/DC converter. In an embodiment, the AC/DC converter malt be a function within microcontroller 424. In yet another embodiment, the AC/DC converter may be a discrete integrated circuit independent of the logic arrangement. In an embodiment, the digital value of the voltage may be converted to decibels.

At a next step 312, the insertion loss may be determined by the logic arrangement. In an example, microcontroller 424 may apply one or more mathematical expressions, such as Equation 1 below, to determine the insertion loss based on the data in decibels.

$$P_{in}(dBm) = \frac{V_{OUT}}{G(20 \text{ mV/dB})} + 10\log_{10}\frac{I_z}{\rho} + 30 \ dBm \qquad \text{Equation 1}$$

TABLE 1

| Variables | |
|---|---|
| Variable | Meaning |
| $I_z$ | Photodiode dark current - this value is specific to a type of photodiode |
| $\rho$ | Photodiode responsivity - this value is specific to a type of photodiode |

TABLE 1-continued

Variables

| Variable | Meaning |
|---|---|
| $P_{in}$ | Power |
| $V_{OUT}$ | Digital voltage |
| G | Gain for a specific photodiode interface circuit - this amount is based on the circuit |

Equation 1, shown above, may be employed to determine the signal strength in decibels at a specific photodiode. As can be seen, Equation 1 takes into consideration the digital voltage as calculated by the logic arrangement for a specific photodiode. Note that the 30 dBm allows the power to be converted as a decibel in referenced to one milliwatt. In addition, the gain for a specific PDIC may also be taken into account in Equation 1.

To illustrate, consider the following scenario. The power as measured at connector 406 as the signal is coming in from transmitter SFP 402 is −5.36 dBm. The signal is forwarded to photodiode 408 and converted into current, as described above. Hover, in order to compare the received power level (i.e., signal strength) by photodiode 408 against the power received at connector 406, the current of the electrical signal may first have to be converted into analog voltage by PDIC 434 and then converted into a digital value for the voltage by microcontroller 424.

In this example, the digital voltage ($V_{OUT}$) for photodiode 408 is 1.66 volt. The gain or PDIC 434, associated with photodiode 408, is 2 and the current associated with photodiode 408 is 100 pA over 5 µA/mW. By using Equation 1, the received power level by photodiode 408 in decibels is determined to be −5.49 dBm. Once the received power level has been determined in decibels, insertion loss may be calculated by taking the difference between the power as measured at connector 406 and the actual signal strength received by photodiode 408 (e.g., −5.489 dBm−(−5.36 dBm)=−0.129 dBm). Thus, the IT personnel may use the insertion loss data to perform troubleshooting.

Accordingly, the method described above may also be employed to determine the insertion loss between the power at a transmitter SFP and the received power level at a photodiode. To perform the insertion loss calculation, the optical transmit power associated with the transmitter SFP may be required to be provided to the logic arrangement. Those skilled in the art are aware that the optical transmit power for a transmitter SFP is usually provided by the manufacturer of the SFP. Accordingly, the insertion loss value between the power at the transmitter SFP and the received power level at the photodiode is usually larger since power loss may occur when the signal is being sent from the transmitter SFP to the fiber optic tap since the transmitter SFP is usually connected to the input port of the fiber optic tap by a fiber optic cable of variable length.

At a next step 314, the data may be displayed and/or additional analysis may be performed. In an example, once the optical signal power level has been determined, the logic arrangement may determine the insertion loss and may display the optical signal strength visually on a visual display arrangement 428. If additional analysis is desired, the data collected by the logic arrangement may be forward to an external device for more in-depth analysis, via ports 426 (e.g., RS232), and 432 (e.g., Ethernet). Further, logic arrangement may also include a port for receiving updates, such as port 430.

As aforementioned, each diode is configured to perform at least two functions. The second function (316) includes forwarding the optical signal through photodiodes towards the splitter or the transmit (TX) connector, as shown in FIG. 3B.

At a next step 318, the first photodiode may forward the optical signal to a splitter.

Upon receiving the signal, the splitter may split the optical signal into two or more parts, at a next step 320, and transmit the optical signal to two fiber cables. In an example, if two photodiodes (photodiodes 418 and 420) are available to receive the optical signal, a splitter 416 may split the optical signal between the two photodiodes. The split that may occur may be based on user's discretion. In an example, if the user has designated a 60/40 split, then photodiode 418 may receive 60 percent of the signal strength (as shown by signal 1 of block 322) and photodiode 420 may receive 40 percent of the signal strength (as shown by signal 2 of block 324).

Once the optical signal has been split into signal 1 and signal 2, various different functions may be performed on each signal.

In an example, signal 1 may be received by a second photodiode, such as photodiode 418, at a next step 326. Upon receiving the optical signal, the second photodiode may be configured to perform at least two functions, (1) sending the optical signal to an external device and (2) converting the signal light in order to perform analysis. As cull be appreciated from the foregoing, both functions may be performed in any order or may be performed simultaneously.

At a next step 328, the signal may be transmitted to an external device (such as a transceiver) via a transmit connector. In an example, signal 1 may be sent from photodiode 418 to external device connected to an external device 444 via a second connector 440.

In addition, the signal may be converted and analysis may be performed. Steps 330-340 are similar to steps 306-314 (of FIG. 3B). In other words, at a next step 330, the second photodiode may convert the incident light power from the optical signal into an electrical signal. At a next step 332, the current of the electrical signal may be received and processed by a second PDIC. At a next step 334, the analog voltage is received and converted into a digital value for the voltage by an AC/DC converter. Afterward, the digital value of the voltage may be converted into decibel by a logic arrangement, such as microcontroller 424. At a next step 336, the insertion loss may be determined by mathematical expressions, such as Equation 1 above. At a next step 338, the data mats be displayed and/or additional analysis may be performed.

In regard to signal 2, once signal 2 has been received by a third photodiode (step 340), such as photodiode 420, similar steps may be taken for signal 2. In an example, signal 2 may be transmitted to an external device 446 (such as a monitoring device) via a third connector 442, at a next step 342. Meanwhile, the signal strength of signal 2 may be determined by first converting the signal light received by the third photodiode (420) into an electrical signal with a current component (step 344) and forwarding the current to a third PDIC (step 346). The third PDIC may convert the current into analog voltage and may forward the analog voltage to an AC/DC converter (step 348). Once the AC/DC converter receives the analog voltage, the analog voltage may be converted to a digital value for the voltage. Once the conversion has occurred, a logic arrangement (such as microcontroller 424) may convert the digital value of the voltage into decibels (step 350). With the signal strength in decibel, the logic arrangement is able to determine insertion loss at the third photodiode by comparing the signal strength as received by the third photodiode against the power as received by, the first connector. In addition, using the same optical signal received by the third photodiode, an insertion loss value may also be determined between the power at the transmitter SFP and the received power level at the third photodiode. The insertion loss data may then be displayed and/or sent to an external system for further analysis (step 352).

Figure 4:
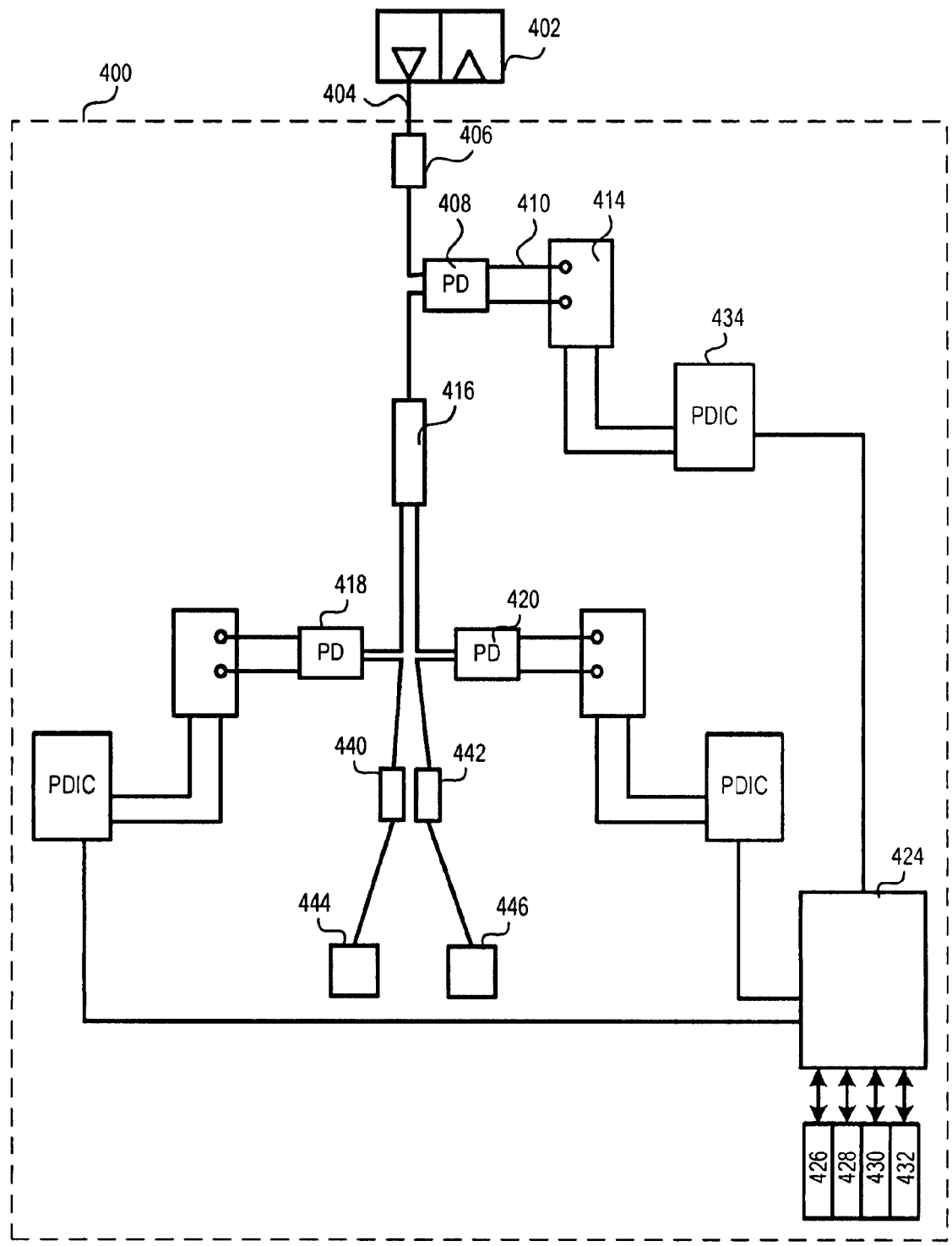
FIG. 4 shows, in an embodiment of the invention, a flow diagram of a signal being sent by a transmitter through a fiber optic tap.

As can be appreciated from FIGS. 3 and 4, data about the strength of the optical signal is being calculated and visually displayed, which is different from the prior all. With visual confirmation, the strength of the optical signal being received by each photodiodes may be quickly determined. If problems exist, the user, such as an IT personnel, may be able to realize through visual confirmation and begin troubleshooting. In the prior art, an IT personnel's response to potential problem may be significantly less since the IT personnel may not be aware of the problem without logging onto the system. In addition, the IT personnel may utilize the data calculated, such as insertion loss, to narrow down the scope of the problem. Thus, with visual confirmation, the IT personnel may respond in a more timely manner, thereby reducing potential loss of data and even minimizing hardware damages.

Figure 5:
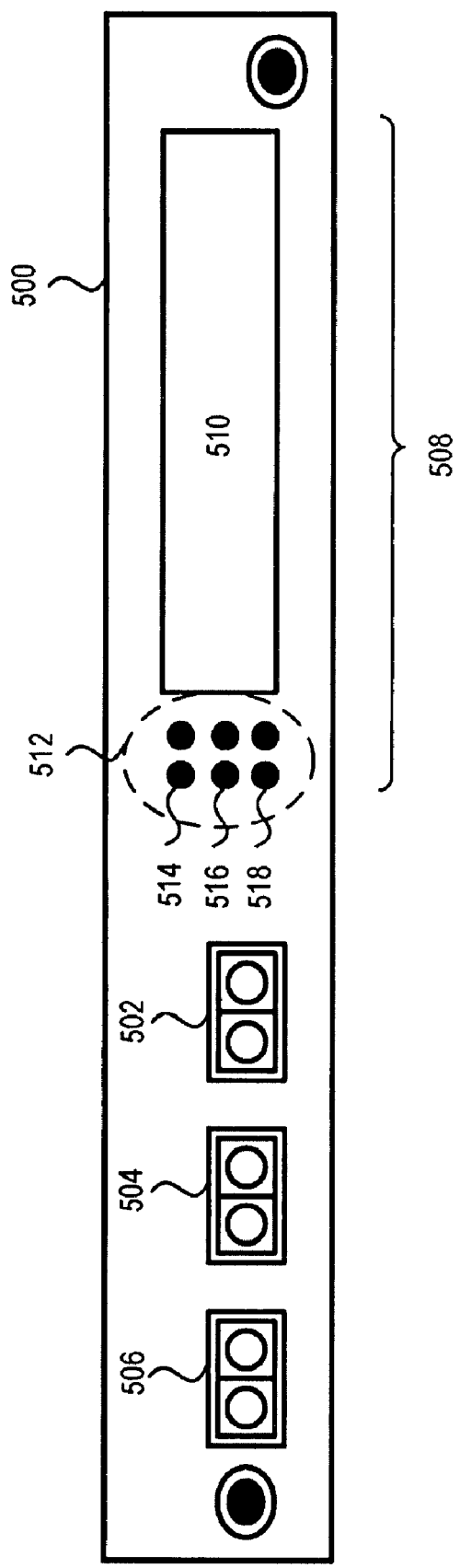
FIG. 5 shows, in an embodiment of the invention, an example of a fiber optic tap with a visual performance display, arrangement.

FIG. 5 shows, in an embodiment of the invention, an example of a fiber optic tap with a visual performance display arrangement. An enhanced fiber optic tap 500 may include a plurality of ports 502, 504 and 506. In this example, enhanced fiber optic tap 500 may include two network ports (502 and 504) and a monitoring port (506). As can be appreciated from the foregoing, enhanced fiber optic tap 500 may be any device that is capable of directing Ethernet traffic via a fiber optic line. Thus, enhanced fiber optic tap 500 may be a router, a switch, a network tap, and the like.

Unlike the prior art, enhanced fiber optic tap 500 now may also include a visual display arrangement 508, which may enable enhanced fiber optic tap 500 to display information about the optical signal received. In an embodiment, visual display arrangement 508 may include a display screen 510 and a light-emitting diode (LED) arrangement 512.

In an embodiment, LED arrangement 512 may include a plurality of LEDs. In an example, a set of LEDs 514 (e.g., one for input optical signal and one for output optical signal) may be associated with port 506. Similarly, a set of LEDs 516 may be associated with port 504. In addition redundant power set of LEDs (518) may also be provided.

In an embodiment, the LED pair may be employed to display the strength of the optical signal being received by the port. In an example, if the signal strength being received by network port 502 is strong, then the input LED may be a steady green light display, for example. However, if the signal strength is weak, then the input LED may be a blinking red light display, for example. As can be appreciated from the foregoing, the color of the LED light and the way the light is displayed (e.g., stead), blinking, etc.) may depend upon a manufacturer's discretion.

In an embodiment, display screen 510 may be employed to display statistical data, such as insertion loss. Accordingly, the size of the display screen may be dependent upon a manufacturer's configuration preference. In an example, the size of the display screen may depend upon the size of the network device. In addition, the display screen may be made from different materials. In an example, display screen 510 may be an LCD (liquid crystal display) screen.

In addition to displaying data from each photodiode about insertion loss, other data may also be displayed. In an embodiment, the data displayed may be periodically updated to visually display the real-time data. In another embodiment, the data parameters that may be displayed may be cycled. In other words, the amount of data that may be viewed may be limited to the display screen. To enable the different data parameters to be viewed, different methods may be employed to determine when the network data may be cycled. In an example, data parameters may be displayed for a pre-set time period. In another example, a control component, such as a button, may be utilized to enable the IT personnel to select the desired data parameters. In addition, the mode in which the data parameters may be displayed may vary. In an example, the network data may be shown as text. In another example, the network data may be shown graphically (e.g., charts, bar graphs, etc.).

As can be appreciated from the foregoing, one or more embodiments of the present invention provide a photodiode assembly within an enhanced fiber optic tap arrangement. With a photodiode arrangement, statistical data about the signal strength being received by the fiber optic tap arrangement may be determined without negatively impacting network data traffic flow. Also, the enhanced fiber optic tap arrangement includes a visual display arrangement for displaying the statistical data, thereby providing a quick visual confirmation of the optical signal being received. With visual confirmation, troubleshooting may be performed in a timely manner. Thus, efficiency may increase and cost may decrease as potential problems are identified.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement in a fiber optic network device for analyzing a set of optical signals traversing said fiber optic network device, comprising:

a set of ports, said set of ports including at least a set of input ports for receiving said set of optical signals and a set of output ports for outputting said set of optical signals from said fiber optic network device;

a set of photodiodes, said set of photodiodes being configured at least for receiving and forwarding said set of optical signals; and a splitter, said splitter being configured at least for
receiving said set of optical signals from a first photodiode of said set of photodiodes,
splitting said set of optical signals into at least a first part and a second part, and
forwarding said first part to a second photodiode of said set of photodiodes and said second part to a third photodiode of said set of photodiodes, whereas said set of optical signals is configured to traverse said fiber optic network device between said set of input ports and said set of output ports irrespective whether power is provided to circuitry of said fiber optic network device.

2. The arrangement of claim 1 wherein said set of photodiodes being configured for at least converting said set of optical signals into a set of electrical signals, said set of electrical signals including a current component.

3. The arrangement of claim 2 further includes a set of photodiode interface circuits (PDICs), at least one PDIC of said set of PDICs being associated with a photodiode of said set of photodiodes.

4. The arrangement of claim 3 wherein said set of PDICs is configured at least for converting said set of electrical signals with said current component into a set of analog voltages.

5. The arrangement of claim 4 further includes a logic arrangement, said logic arrangement being configured at least for converting said set of analog voltages to a set of digital values for said set of analog voltages.

6. The arrangement of claim 5 wherein said logic arrangement is a microcontroller.

7. The arrangement of claim 5 wherein said logic arrangement is further configured at least to calculate statistical data from said set of digital values.

8. The arrangement of claim 7 wherein said statistical data includes at least insertion loss.

9. The arrangement of claim 8 further includes a visual display arrangement, said visual display arrangement is configured at least for displaying at least part of said statistical data.

10. The arrangement of claim 9 wherein at least part of said statistical data is forwarded to an external device for analysis.

11. A method for determining signal strength of a set of optical signals being received by a fiber optic network device, comprising:
    receiving said set of optical signals by a first photodiode of a set of photodiodes, said set of photodiodes residing within said fiber optic network device;
    forwarding said set of optical signals to a splitter, said splitter being configured at least for
        receiving said set of optical signals from said first photodiode,
        splitting said set of optical signals into at least a first part optical signal and a second part optical signal, and
        forwarding said first part optical signal to a second photodiode of said set of photodiodes and said second part optical signal to a third photodiode of said set of photodiodes; and
    converting said set of optical signal into a first electrical signal with a current component by said first photodiode, wherein said first electrical signal with a current component is utilized for determining said signal strength of said set of optical signals received by said first photodiode, whereas said data traffic is configured to traverse said network device between said set of input network ports and said set of output network ports irrespective whether power is provided to circuitry of said network device.

12. The method of claim 11 further includes
    converting said first part optical signal by said second photodiode into a second electrical signal with a current component; and
    converting said second part optical signal by said third photodiode into a third electrical signal with a current component.

13. The method of claim 12 further includes
    converting said first electrical signal with a current component into a first analog voltage by a first photodiode interface circuit (PDIC);
    converting said second electrical signal with a current component into a second analog voltage by a second photodiode interface circuit (PDIC); and
    converting said third electrical signal with a current component into a third analog voltage by a third photodiode interface circuit (PDIC).

14. The method of claim 13 further includes receiving said at least one of said first analog voltage, said second analog voltage, and said third analog voltage by a logic arrangement.

15. The method of claim 14 further includes converting said at least one or said first analog voltage, said second analog voltage, and said third analog voltage into a set of digital values by said logic arrangement.

16. The method of claim 15 wherein said logic arrangement is a microcontroller.

17. The method of claim 16 further includes calculating statistical data from said set of digital values by employing said logic arrangement.

18. The method of claim 17 wherein said statistical data includes at least insertion loss.

19. The method of claim 18 further includes displaying at least part of said statistical data by utilizing a visual display arrangement.

20. The method of claim 19 further includes forwarding said at least part of said statistical data to an external device for analysis.

* * * * *